United States Patent [19]

Lewis

[11] 3,999,706
[45] Dec. 28, 1976

[54] HUMIDITY AND TEMPERATURE RESPONSIVE DEVICE AND METHOD OF MAKING THE SAME

[75] Inventor: Jay L. Lewis, Knoxville, Tenn.

[73] Assignee: Robertshaw Controls Company, Richmond, Va.

[22] Filed: Feb. 25, 1975

[21] Appl. No.: 553,019

[52] U.S. Cl. ............................. 236/44 C; 62/176 E; 73/336
[51] Int. Cl.² ..................................... G05D 23/08
[58] Field of Search ................ 236/44 C, 99 A, 87; 73/336, 344; 337/300; 200/61.06; 62/176

[56] References Cited
UNITED STATES PATENTS

| | | | |
|---|---|---|---|
| 1,504,080 | 8/1924 | Roesch | 236/44 C |
| 2,059,846 | 11/1936 | Bulger | 236/44 C |
| 2,106,083 | 1/1938 | Chappell et al. | 236/44 C |
| 2,191,630 | 2/1940 | Shutts | 200/61.06 |
| 2,949,513 | 8/1960 | Davidson | 200/61.06 |
| 3,664,580 | 5/1972 | Martin | 236/87 X |
| 3,730,426 | 5/1973 | Braukmann | 236/44 C |
| 3,859,616 | 1/1975 | Ladany | 236/44 C |

*Primary Examiner*—William F. O'Dea
*Assistant Examiner*—William E. Tapolcai, Jr.
*Attorney, Agent, or Firm*—Candor, Candor & Tassone

[57] ABSTRACT

A humidity and temperature responsive device having a temperature sensor provided with a part that moves upon changes in sensed temperature and having a humidity sensor that is provided with a part that moves upon changes in sensed humidity. A tension spring interconnects the movable parts together so that the same act together to vary a bleed valve arrangement so that the output pressure of the device can be utilized to indicate enthalpy or operate control devices to select air with high or low enthalpy.

30 Claims, 3 Drawing Figures

HUMIDITY AND TEMPERATURE RESPONSIVE DEVICE AND METHOD OF MAKING THE SAME

This invention relates to an improved humidity and temperature responsive device as well as to an improved method of making such a device or the like.

It is well known that devices have been provided wherein both humidity and temperature are sensed in order to provide an output of the device that is in relation to the sensed humidity and temperature, such device thereby measuring enthalpy since enthalpy is determined by a combination of ambient temperature and ambient humidity.

It is a feature of this invention to provide an improved humidity and temperature responsive device of the above type.

In particular, one embodiment of this invention provides a humidity and temperature responsive device having a support means carrying an output producing means. A temperature responsive means is carried by the support means and is operatively associated with the output means to vary the same in response to temperature changes. A humidity responsive means is carried by the support means and is operatively associated with the output means to vary the same in response to humidity changes. Biasing means interconnect the temperature responsive means and the humidity responsive means together so that the same act together to vary the output means whereby the output means can be utilized to indicate enthalpy, operate devices to select air with high or low enthalpy, or for other uses as desired.

Therefore, it is an object of this invention to provide an improved humidity and temperature responsive device having one or more of the novel features set forth above or hereinafter shown or described.

Another object of this invention is to provide an improved method of making such a device or the like.

Other objects, uses and advantages of this invention are apparent from a reading of this description which proceeds with reference to the accompanying drawings forming a part thereof and wherein.

Figure 1:
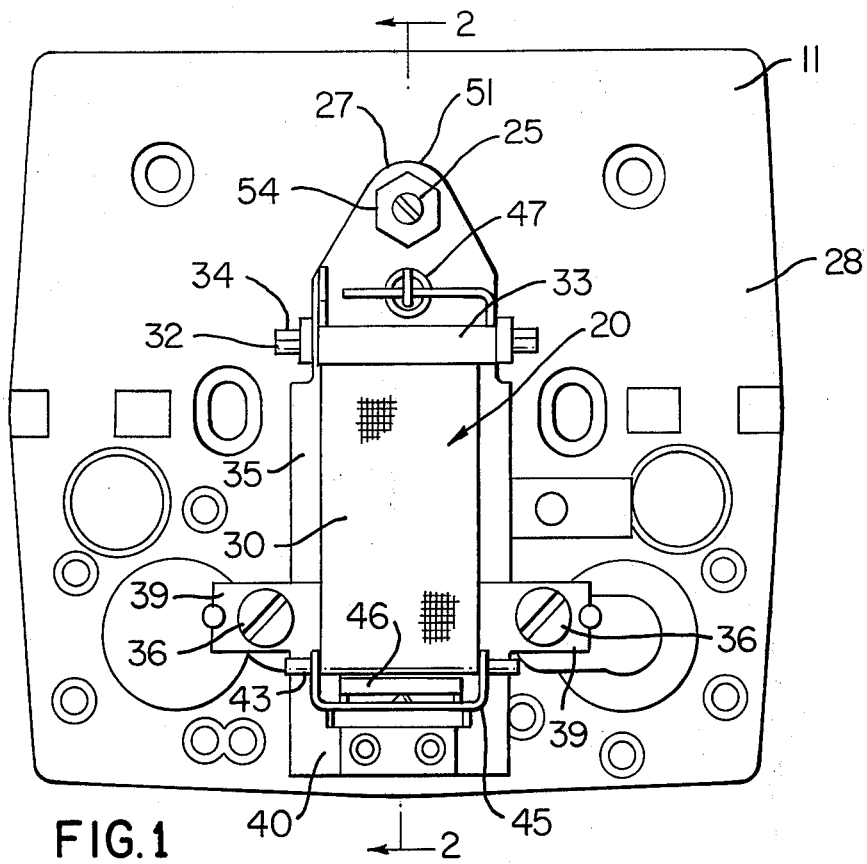
FIG. 1 is a front view of the improved humidity and temperature responsive device of this invention with the cover thereof removed.

While the humidity and temperature responsive device of this invention is hereinafter described as providing an output pressure in relation to sensed humidity and temperature, it is to be understood that the various features of this invention can be utilized singly or in any combination thereof to provide an output other than a pressure output as desired.

Therefore, this invention is not limited to only the embodiment illustrated in the drawings, because the drawings are merely utilized to illustrate one of the wide variety of uses of this invention.

Figure 2:
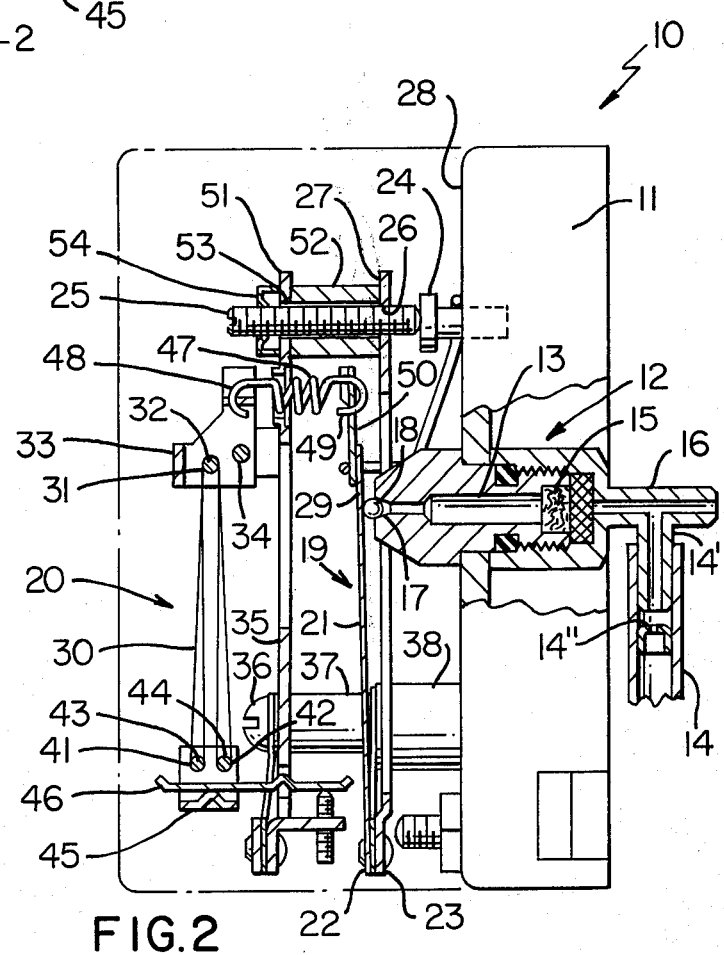
FIG. 2 is a cross-sectional view of the device of FIG. 1 and is taken substantially on line 2-2 thereof, FIG. 2 schematically illustrating a cover for the device by a dash-dotted line.
Figure 3:
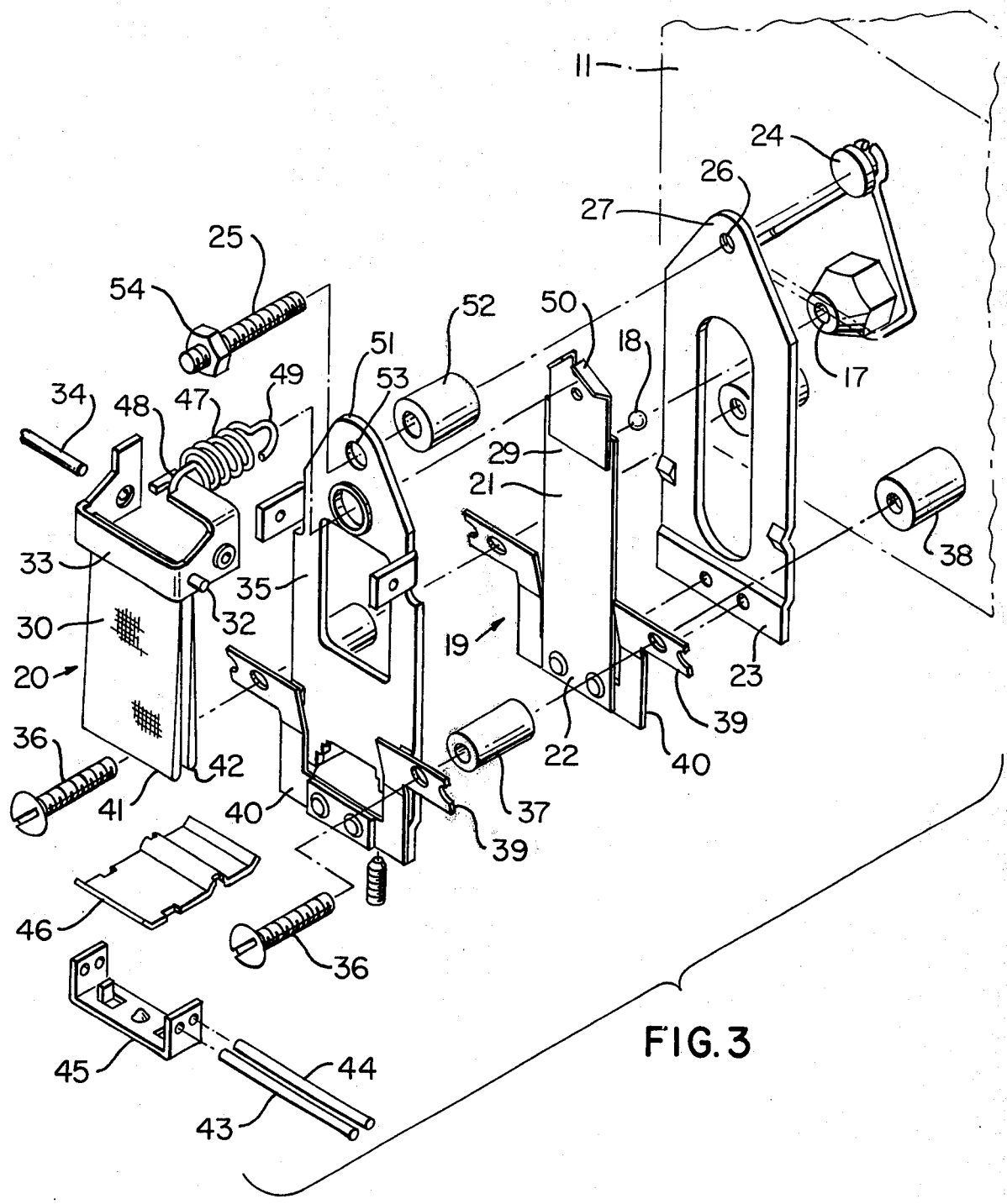
FIG. 3 is an exploded perspective view illustrating the various operating parts of the device of FIGS. 1 and 2.

Referring now to FIGS. 1 and 2, the improved humidity and temperature responsive device of this invention is generally indicated by the reference numeral 10 and comprises a support means 11 that carries an output producing means that is generally indicated by the reference numeral 12 and comprises a bleed valve arrangement.

In particular, the bleed valve arrangement 12 includes an internal chamber 13 of the support means 11 that is adapted to be supplied fluid under pressure from an external source (not shown) and leading to the chamber 13 by a conduit means 14 coupled to a nipple 14' of an outlet nipple 16 of the housing 11 that leads to the chamber 13 through a suitable filter means 15 and that can be interconnected to a pressure indicating means, to fluid operated control means, or other means as will be apparent hereinafter, the source conduit 14 having a suitable restrictor 14'' therein.

The chamber 13 also leads to a frusto-conical valve seat 17 that leads to the atmosphere or vent and that is controlled by a ball valve member 18 so that the amount of opening of the valve seat 17 by the ball valve 18 controls the pressure of the fluid in the chamber 13 and, thus, the output pressure of the device 10.

The support means 11 carries a temperature responsive means or temperature sensor that is generally indicated by the reference numeral 19 and a humidity responsive means or humidity sensor that is generally indicated by the reference numeral 20, the sensors 19 and 20 controlling the amount of bleed through the valve seat 17 in relation to sensed temperature and sensed humidity as will be apparent hereinafter.

The temperature responsive means 19 comprises an elongated bimetallic member 21 having one end 22 thereof fastened to a support member 23 that is relatively rigid and is in turn mounted against a fixed button projection 24 of the support means 11 by a threaded adjusting member 25 threadedly disposed in a threaded bore 26 in the end 27 of the support member 23 and abutting against the button support 24 as illustrated in FIG. 2.

In this manner, rotation of the adjusting member 25 adjusts the position of the support leg 23 relative to the top surface 28 of the support means 11 and, thus, thereby adjusts the position of the fixed end 22 of the bimetal member 21 relative to the front surface 28 of the support means 11 for initially selecting the temperature required for the bimetal member 21 to vary its effect on the ball valve member 18 so that a certain output pressure will be produced in the chamber 13.

For example, the bimetal member 21 is, in effect, cantilevered mounted to the support means 11 in such a manner that the free end 29 of the bimetal member 21 bears against the ball 18 and tends to hold the same against the valve seat 17 in opposition to the force of the pressure fluid in a chamber 13. However, because the bimetal member 21 is resilient, the same has a certain spring force acting in the direction to close the ball valve member 18 against the valve seat 17 and thereby such spring force can be overcome by the pressure in the chamber 13.

The bimetal member 21 is so constructed and arranged that the same is direct acting in that as the ambient temperature or temperature sensed by the bimetal member 21 increases, the same warps in a direction toward the valve seat 17 and thereby increases its force that tends to hold the ball valve member 18 against the valve seat 17 and thereby increases the amount of pressure force required in the chamber 13 to overcome the closing of the ball valve member 18. Thus, the resulting pressure value of the fluid in the chamber 13 is directly proportional to the sensed temperature, the pressure in the chamber 13 decreasing as the temperature being sensed decreases and the pressure in the chamber 13 increasing as the temperature being sensed increases The humidity sensor 20 includes an elongated nylon ribbon 30 looped as arranged in FIG. 2 so that one part 31 thereof loops around a pin 32 of a member 33 that is pivotally mounted by a pivot pin 34 to a support member 35 that is supported to the front surface 28 of the support means 11 by fastening members 36 and spacing posts 37 and 38 as illustrated, each set of posts 37 and 38 capturing an ear 39 of a support bracket 40 therebetween with the support bracket 40 also being fastened to the end 22 of the bimetal member 21 as illustrated.

The nylon ribbon 30 has other parts 41 and 42 thereof respectively looped around a pair of pins 43 and 44 respectively carried by a bracket member 45 that bears against an ambient temperature compensating bimetal member 46 carried by the support member 35 as illustrated whereby the bimetal member 46, in effect, holds the bracket 45 in a fixed spaced position relative to the pivotally mounted member 33.

The nylon ribbon 30 can be of the type disclosed in U.S. Patent No. 3,718,280 and is so constructed and arranged that the same tends to elongate between the parts 33 and 45 as the sensed humidity increases and tends to contract or shrink between the members 33 and 45 as the sensed humidity decreases. Thus, increasing humidity will permit the member 33 to pivot in a clockwise direction in FIG. 2 and a decreasing humidity will cause the member 33 to pivot in a counterclockwise direction in FIG. 2.

A biasing means comprising a coiled tension spring 47 interconnects the movable parts 33 and 29 of the sensors 20 and 19 together. In particular, the tension spring 47 has one end 48 thereof hooked to the member 33 and the other end 49 hooked to a plate 50 fastened to the free end 29 of the bimetal member 21 whereby the biasing means 47 permits the sensors 19 and 20 to act on the valve ball member 18 independently or together to vary the pressure in the chamber 13 as will be apparent hereinafter.

The support member 35 has its end 51 thereof held spaced from the end 27 of the other support member 23 by a spacing tubular member 52 which has the threaded adjusting member 25 passing therethrough and extending out through an opening 53 in the support member 35 to have a nut 54 threadedly disposed thereon whereby it can be seen in FIG. 2 that as the member 25 is adjusted, both the support members 35 and 23 are varied in their spacing relative to the front surface 28 of the support means 11 and thereby the sensors 19 and 20 can have their initial setting adjusted by the adjusting member 25 as will be apparent hereinafter.

Therefore, it can be seen that the device 10 of this invention can be formed from a relatively few and inexpensive parts to function as a humidity and temperature responsive device in a unique manner now to be described.

Assuming that the device 10 has the member 25 thereof adjusted to a desired position thereof so that when the temperature being sensed by the temperature sensor 19 is 75° F (or any desired set temperature) and the relative ambient humidity being sensed by humidity sensor 20 is 50 per cent (or any desired set humidity), the sensors 19 and 20 act together on the ball valve member 18 of the bleed valve means 12 so that the output pressure in the chamber 13 is at a certain value, then any subsequent change in sensed relative humidity and/or any change in sensed ambient temperature from the initial selection of temperature and humidity will correspondly change that certain output value of the pressure fluid being maintained in the chamber 13 so that if a fluid operated indicator is interconnected to nipple 16 of the device 10, such indicator will indicate such change in the pressure.

For example, such indicator can indicate enthalpy as the same is determined by ambient temperature and ambient humidity. Alternately, the nipple 16 of the device 11 could be interconnected to a fluid operated device which would tend to monitor the air being supplied to the location of the device 10 by selecting air with high or low enthalpy to be directed to the area containing the device 10 depending upon the changes in the pressure of the chamber 13.

In any event, it can be seen that should the humidity being sensed by the humidity sensor 20 increase, the ribbon 30 elongates and thereby permits the tension spring 47 to pivot the member 33 in a clockwise direction in FIG. 2 which results in a decrease in the force of the tension spring 47 tending to pull the end 29 of the bimetal member 21 away from the valve seat 17 so that the total force of the bimetal member 21 acting in a direction toward the valve seat 17 increases and thereby causes the pressure in the chamber 13 to increase and thus indicate an increase in sensed humidity.

Conversely, should the humidity being sensed by the sensor 20 decrease, the nylon ribbon 30 tends to shrink or contract and thereby causes pivoting of the member 33 in a counterclockwise direction in FIG. 2 so that the force of tension spring 47 is increased in its pulling effect on the bimetal member 21 away from the valve seat 17 so that the pressure in the chamber 13 correspondingly decreases and thus indicates a decrease in sensed humidity.

Should the temperature sensor 19 sense an increase in temperature, the bimetal member 21 warps toward the valve seat 17 in FIG. 2 and thereby increases its force that tends to close the ball valve member 18 against the seat 17 so that the pressure in the chamber 13 increases to indicate this increase in sensed temperature.

Conversely, should the temperature being sensed by the temperature sensor 19 decrease, the bimetal member 21 tends to warp slightly away from the valve seat 17 in FIG. 2 and thereby decreases its force acting to hold the ball valve member 18 against the valve seat 17 whereby the pressure in the chamber 13 decreases and thus indicates this decrease in sensed temperature.

Therefore, it can be seen that the sensors 19 and 20 through the biasing means 47 are adapted to act together to control the bleed valve means 12 whereby the device 10 can accurately sense humidity and temperature to either indicate the same or to control the environment containing the device 10 as previously described.

Thus, it can be seen that this invention not only provides an improved temperature and humidity responsive device, but also this invention provides a method of making such a device or the like.

While the form and method of this invention now preferred have been described and illustrated as required by the Patent Statute, it is to be understood that other forms and method steps can be utilized and still fall within the scope of the appended claims.

I claim:

1. A humidity and temperature responsive device comprising support means carrying an output producing means, a temperature responsive means carried by said support means and being operatively associated with said output means to vary the same in response to temperature changes, a humidity responsive means carried by said support means and being operatively associated with said output means to vary the same in response to humidity changes, and biasing means interconnecting said temperature responsive means and said humidity responsive means together so that the same act together to vary said output means, said temperature responsive means comprising a bimetal member, said bimetal member comprising an elongated bimetal member having opposed ends of which one end is cantilivered mounted to said support means.

2. A device as set forth in claim 1 wherein said biasing means is operatively interconnected to the other end of said bimetal member.

3. A device as set forth in claim 2 wherein said biasing means comprises a tension spring having opposed ends, one end of said spring being interconnected to said other of said bimetal member and the other end of said spring being interconnected to said humidity responsive device.

4. A humidity and temperature responsive device comprising support means carrying an output producing means, a temperature responsive means carried by said support means and being operatively associated with said output means to vary the same in response to temperature changes, a humidity responsive means carried by said support means and being operatively associated with said output means to vary the same in response to humidity changes, and biasing means interconnecting said temperature responsive means and said humidity responsive means together so that the same act together to vary said output means, said humidity responsive means comprising an elongated member that increases its length as the sensed humidity increases and decreases its length as the sensed humidity decreases.

5. A device as set forth in claim 4 wherein said elongated member is operatively interconnected to an element that is pivotally mounted to said support means whereby said element is pivoted relative to said support means in response to changes in sensed humidity.

6. A device as set forth in claim 5 wherein said biasing means is operatively interconnected to said element.

7. A device as set forth in claim 6 wherein said biasing means comprises a tension spring having opposed ends, one end of said spring being interconnected to said element and the other end of said spring being interconnected to said temperature responsive means.

8. A device as set forth in claim 7 wherein said temperature responsive means comprises a bimetal member cantilevered mounted to said support means and having a free end that is interconnected to said other end of said spring.

9. A humidity and temperature responsive device comprising support means carrying an output producing means, a temperature responsive means carried by said support means and being operatively associated with said output means to vary the same in response to temperature changes, a humidity responsive means carried by said support means and being operatively associated with said output means to vary the same in response to humidity changes, and biasing means interconnecting said temperature responsive means and said humidity responsive means together so that the same act together to vary said output means, each of said temperature responsive means and said humidity responsive means having a part that moves upon a change in its respective sensed condition, one of said parts acting directly on said output means.

10. A device as set forth in claim 9 wherein said output means comprises a fluid bleed value means against which said one part engages.

11. A device as set forth in claim 10 wherein said bleed valve means includes a ball valve member that is engaged by said one part.

12. A device as set forth in claim 9 wherein said biasing means interconnects said parts together.

13. A device as set forth in claim 12 wherein said biasing means comprises a tension sprin having opposed ends respectively interconnected to said parts.

14. In combination, a humidity sensor having a generally longitudinal axis and having a part that moves in response to changes in sensed humidity, a temperature sensor also having a generally longitudinal axis that is disposed substantially parallel to said axis of said humidity sensor and having a part that moves in response to changes in sensed temperature, and biasing means interconnecting said parts together so that said parts act together to vary an output means, said biasing means comprising a tension spring having opposed ends respectively interconnected to said parts and being disposed substantially transverse to said axes.

15. A combination as set forth in claim 14 wherein said part of said temperature sensor comprises a bimetal member.

16. In combination, a humidity sensor having a part that moves in response to changes in sensed humidity, a temperature sensor having a part that moves in response to changes in sensed temperature, and biasing means interconnecting said parts together so that said parts act together to vary an output means, said part of said humidity sensor comprising a pivotally mounted member.

17. A combination as set forth in claim 16 wherein said humidity sensor has an elongated member interconnected to said pivotally mounted member, said elongated member elongating on an increase in humidity and shrinking on a decrease in humidity.

18. A method of making a humidity and temperature responsive device comprising the steps of providing a support means carrying an output producing means, disposing a temperature responsive means on said support means so as to be operatively associated with said output means to vary the same in response to temperature changes, disposing a humidity responsive means on said support means so as to be operatively associated with said output means to vary the same in response to humidity changes, interconnecting said temperature responsive means and said humidity responsive means together with biasing means so that the same act together to vary said output means, forming said bimetal member from an elongated bimetal member having opposed ends, and cantilever mounting one end of said bimetal member to said support means.

19. A method as set forth in claim 18 and including the step of interconnecting said biasing means to the other end of said bimetal member.

20. A method as set forth in claim 19 and including the step of forming said biasing means from a tension spring having opposed ends, said step of interconnecting with said biasing means comprising the step of interconnecting one end of said spring to said other of said bimetal member and the other end of said spring to said humidity responsive device.

21. A method of making a humidity and temperature responsive device comprising the steps of providing a support means carrying an output producing means, disposing a temperature responsive means on said support means so as to be operatively associated with said output means to vary the same in response to temperature changes, disposing a humidity responsive means on said support means so as to be operatively associated with said output means to vary the same in response to humidity changes, interconnecting said temperature responsive means and said humidity responsive means together with biasing means so that the same act together to vary said output means, and forming said humidity responsive means from an elongated member that increases its length as the sensed humidity increases and decreases its length as the sensed humidity decreases.

22. A method as set forth in claim 21 and including the step of interconnecting said elongated member to an element that is pivotally mounted to said support means whereby said element is pivoted relative to said support means in response to changes in sensed humidity.

23. A method as set forth in claim 22 wherein said step of interconnecting with said biasing means comprises the step of interconnecting said biasing means to said element.

24. A method as set forth in claim 23 and including the step of forming said biasing means from a tension spring having opposed ends, said step of interconnecting with said biasing means comprising the step of interconnecting one end of said spring to said element and the other end of said spring to said temperature responsive means.

25. A method as set forth in claim 24 and including the step of forming said temperature responsive means from a bimetal member cantilevered mounted to said support means and having a free end that is interconnected to said other end of said spring.

26. A method of making a humidity and temperature responsive device comprising the steps of providing a support means carrying an output producing means, disposing a temperature responsive means on said support means so as to be operatively associated with said output means to vary the same in response to temperature changes, disposing a humidity responsive means on said support means so as to be operatively associated with said output means to vary the same in response to humidity changes, interconnecting said temperature responsive means and said humidity responsive means together with biasing means so that the same act together to vary said output means, forming each of said temperature responsive means and said humidity responsive means with a part that moves upon a change in its respective sensed condition, and causing one of said parts to act directly on said output means.

27. A method as set forth in claim 26 and including the step of forming said output means from a fluid bleed valve means against which said one part engages.

28. A method as set forth in claim 27 and including the step of forming said bleed valve means with a ball valve member that is engaged by said one part.

29. A method as set forth in claim 26 wherein said step of interconnecting with said biasing means comprises the step of interconnecting said parts together with said biasing means.

30. A method as set forth in claim 29 and including the step of forming said biasing means from a tension spring having opposed ends respectively interconnected to said parts.

* * * * *